US008660436B2

(12) United States Patent
Schenk et al.

(10) Patent No.: US 8,660,436 B2

(45) Date of Patent: Feb. 25, 2014

(54) CODED LIGHT TRANSMISSION AND RECEPTION

(75) Inventors: Tim Corneel Wilhelmus Schenk, Eindhoven (NL); Hongming Yang, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 150 days.

(21) Appl. No.: 13/392,891

(22) PCT Filed: Sep. 8, 2010

(86) PCT No.: PCT/IB2010/054039
§ 371 (c)(1), (2), (4) Date: Feb. 28, 2012

(87) PCT Pub. No.: WO2011/030292
PCT Pub. Date: Mar. 17, 2011

(65) Prior Publication Data

US 2012/0163826 A1 Jun. 28, 2012

(30) Foreign Application Priority Data

Sep. 14, 2009 (EP) .................................... 09170179

(51) Int. Cl.

| | |
|---|---|
| ***H04B 10/00*** | (2013.01) |
| ***H04J 14/02*** | (2006.01) |
| ***G05G 1/00*** | (2008.04) |
| ***H05B 37/02*** | (2006.01) |
| ***H05B 39/04*** | (2006.01) |
| ***H05B 41/36*** | (2006.01) |

(52) U.S. Cl.
USPC .............. 398/172; 398/91; 398/140; 315/294

(58) Field of Classification Search
USPC ..................... 398/91, 98–100, 140, 182, 187, 398/189–191; 315/294
See application file for complete search history.

(56) References Cited

U.S. PATENT DOCUMENTS

| | | | | |
|---|---|---|---|---|
| 6,195,341 | B1 | 2/2001 | Sakoda et al. | |
| 2008/0297070 | A1 | 12/2008 | Kuenzler et al. | |
| 2009/0026978 | A1* | 1/2009 | Robinson | 315/294 |
| 2010/0135669 | A1* | 6/2010 | Kim et al. | 398/130 |
| 2010/0295457 | A1* | 11/2010 | Lu et al. | 315/159 |
| 2011/0135317 | A1* | 6/2011 | Chaplin | 398/172 |
| 2013/0026942 | A1* | 1/2013 | Ryan et al. | 315/224 |

FOREIGN PATENT DOCUMENTS

| | | | |
|---|---|---|---|
| EP | 1538802 | A1 | 6/2005 |
| WO | 2006134122 | A1 | 12/2006 |
| WO | 2007095740 | A1 | 8/2007 |
| WO | 2008080071 | A1 | 7/2008 |

* cited by examiner

*Primary Examiner* — Leslie Pascal
*Assistant Examiner* — Casey Kretzer
(74) *Attorney, Agent, or Firm* — Mark L. Beloborodov

(57) ABSTRACT

Coded light has been proposed to enable advanced control of light sources and transmit information using light sources. An assignment for the identification frequencies of light sources enables more unique frequencies to be assigned, i.e. more light sources to be uniquely identified in the system. An available frequency band is divided into non-uniform frequency regions and frequencies are selected from a set of uniformly spaced frequencies in the non-uniform frequency regions. A receiver is based on a successive approach and is enabled to analyze higher harmonics of the received light signals. The light contributions are successively estimated group by group.

15 Claims, 7 Drawing Sheets

CODED LIGHT TRANSMISSION AND RECEPTION

FIELD OF THE INVENTION

The present invention relates to a coded light system. Particularly it relates to methods and devices for assigning identifiers to light sources in a coded light system and detection of the identifiers.

BACKGROUND OF THE INVENTION

Light sources are nowadays applied in lighting systems consisting of a large number of light sources. Since the introduction of solid state lighting several parameters of these light sources can be varied and controlled in a system of light sources. Such parameters include light intensity, light color, light color temperature and even light direction. By varying and controlling these parameters of the different light sources, a light designer or user of the system is enabled to generate lighting scenes. This process is often referred to as scene setting, and is typically quite a complex process due to the multitude of light sources and parameters to be controlled. Typically one controller, or control channel, is required for each light source. This makes it difficult to control a system of more than ten light sources.

To enable a more intuitive and simpler control of the light sources, and to create scenes, the embedding of invisible identifiers in the light output of luminaires has been previously proposed. This embedding of identifiers can be based on unique modulation of the visible light (VL) of the luminaire or by placing of an additional infra-red (IR) light source in the luminaire and uniquely modulate this IR light. The embedding of identifiers in the light will be referred to as coded light (CL).

For the transmission of CL, mostly, light emitting diodes (LEDs) are considered, which allow for a reasonable high modulation frequency and bandwidth. This in turn may result in a fast response of the control system. The identifiers can, however, also be embedded in the light of other light sources, such as incandescent, halogen, fluorescent (FL) and high-intensity discharge (HID) lamps.

These light source identifiers, also referred to as codes, allow for the identification and strength estimation of the individual local illumination contributions. This can be applied in light control applications such as commissioning, light source selection and interactive scene setting. These applications have use in, for example, homes, offices, shops and hospitals. These light source identifiers hence enable a simple and intuitive control operation of a light system, which might otherwise be very complex.

Illumination systems based on LEDs normally consist of a large number, e.g. hundreds, of spatially distributed LEDs. This is partly because a single state-of-the-art LED still cannot provide sufficient illumination and since LEDs are point sources. Due to the large number of LEDs and the broad range of illumination levels that can be supported by each LED, the complexity to calibrate and control such a lighting system is quite high. According to state-of-the-art techniques only a limited number (e.g. up to 100) light sources can be identified in a coded light system.

SUMMARY OF THE INVENTION

It is an object of the present invention to overcome this problem, and to provide methods, devices and system concepts which mitigate the dependency of the number of light sources in the coded light system during assignment and detection of light source identifiers.

Generally, the above objectives are achieved by methods and devices according to the attached independent claims.

According to a first aspect, the above objects are achieved by a method for assigning identifiers to light sources in a coded lighting system, the method comprising the steps of: dividing an available frequency band into N non-uniform frequency regions, and selecting, for each light source, a unique frequency from a set of uniformly spaced frequencies in one of the non-uniform frequency regions, wherein the unique frequency is used to modulate light to be outputted by the each light source, thereby assigning an identifier to the each light source. This provides an efficient assignment process which allows a large number of unique identifiers to be assigned. Thereby a large number of light sources having unique identifiers can be used in a lighting system. In general, the assignment process is done such that multiple harmonics may be used during detection of the identifiers. This enables for efficient estimation for the assigned identifiers.

A spacing between the uniformly spaced frequencies may differ between different ones of the frequency regions. This provides for a flexible assignment method.

A spacing between the uniformly spaced frequencies may be greater for a low frequency region than for a high frequency region. Since a greater spacing may allow for more accurate estimation, this may provide an assignment process which enables un-equal error-robustness. However, depending on the receiver, equal error-robustness may be achieved.

The frequency band may, between normalized frequency values 0 and 1, be divided into the N frequency regions. For $1 \leq n \leq N-1$ a width of frequency region n may be given by normalized frequency value $2/((n+1)(n+2))$. Such widths correspond to widths of harmonics.

For $1 \leq n \leq N-1$ a lower limit for frequency region n may be given by normalized frequency value $(n-1)/(n+1)$. This provides each frequency region to correspond to ordered harmonics.

Light to be outputted may be modulated according to pulse width modulation, and a duty cycle of the pulse width modulation may depend on at least one of the unique frequency and a dimming level of the light source. This provides the identifiers to be associated with the modulation method of the light sources.

According to a second aspect, the above objects are achieved by a method for estimating identifiers assigned to light sources in a coded lighting system, wherein the identifiers have been assigned according to the above, the method comprising the steps of: receiving light; determining a unique frequency selected from a set of uniformly spaced frequencies in one of N non-uniform frequency regions of an available frequency band by, for frequency region n, $1 \leq n \leq N-1$, estimating the unique frequency based on harmonic $(n+1)$ of received light, and determining the identifiers from the unique frequencies. This provides an efficient and low computational method for estimating identifiers assigned according to the above.

The method may further comprise, from the received light, estimating an amplitude of the received light. The method may further comprise, from the received light, estimating a phase of the received light. The amplitude and phase may be used to more accurately determine the identifiers from the unique frequencies.

The method may further comprise, based on the amplitude, determining individual illumination contributions.

The method may further comprise subtracting a total estimated signal assigned a frequency in frequency region n before estimating the unique frequency for frequency region n+1. This provides a method for successively estimating the identifiers. In general the harmonics of frequency region n will be correlated with the harmonics of frequency region n+1. However, by subtracting the total estimated signal for frequency region n before estimating the unique frequencies for frequency region n+1 the influence of harmonics of frequency region n when estimating frequencies of frequency region n+1 is minimized. Therefore an estimation process requiring modest computational requirement whilst still providing accurate estimation results is enabled.

According to a third aspect, the above objects are achieved by a light driver for assigning identifiers to light sources in a coded lighting system, comprising: a processing unit arranged to assign an identifier to the light sources whereby, for each light source, the identifier determines a unique frequency to be used to modulate light to be outputted by the each light source, by performing the steps of: dividing an available frequency band into N non-uniform frequency regions, and selecting the unique frequency from a set of uniformly spaced frequencies in one of the non-uniform frequency regions.

The light driver enables an efficient implementation of a method for assigning identifiers to light sources in a coded lighting system.

According to a fourth aspect, the above objects are achieved by a receiver for estimating identifiers assigned to light sources in a coded lighting system, comprising: a light receiver; a processing unit arranged to perform the steps of: determining a unique frequency selected from a set of uniformly spaced frequencies in one of N non-uniform frequency regions of an available frequency band by, for frequency region n, $1 \le n \le N-1$, estimating the unique frequency based on harmonic (n+1) of light received by the light receiver, and determining the identifiers from the unique frequencies.

The receiver enables an efficient implementation of a method for estimating identifiers assigned to light sources in a coded lighting system.

It is noted that the invention relates to all possible combinations of features recited in the claims. Likewise, the advantages of the first aspect applies to the second aspect, the third aspect and the fourth aspect, and vice versa.

BRIEF DESCRIPTION OF THE DRAWINGS

This and other aspects of the present invention will now be described in more detail, with reference to the appended drawings showing embodiment(s) of the invention.

FIG. 2(*b*) is a light source according to an embodiment;

DETAILED DESCRIPTION

The below embodiments are provided by way of example so that this disclosure will be thorough and complete, and will fully convey the scope of the invention to those skilled in the art. Like numbers refer to like elements throughout.

Figure 1:
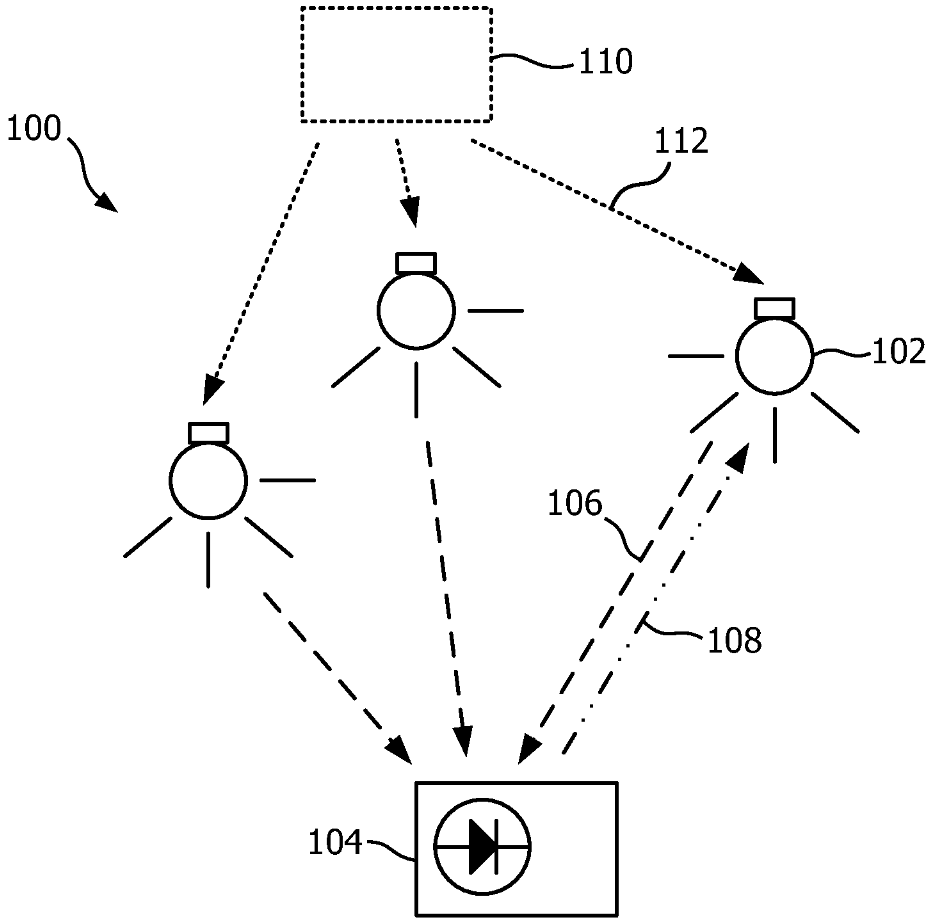
FIG. 1 is a lighting system according to an embodiment.

FIG. 1 illustrates a lighting system 100 comprises at least one light source, schematically denoted by the reference numeral 102. The light source 102 may be part of a lighting control system, thus the lighting system 100 may be denoted as a coded lighting system. It should be noted that the term "light source" means a device that is used for providing light in a room, for purpose of illuminating objects in the room. Examples of such light providing devices include lighting devices and luminaires. A room is in this context typically an apartment room or an office room, a gym hall, a room in a public place or a part of an outdoor environment, such as a part of a street. Each light source 102 is capable of emitting light, as schematically illustrated by the arrow 106.

Due to the large number of light sources 102 and the broad range of illumination levels that can be supported by each light source 102, the complexity to calibrate and control such a lighting system 100 is quite high. According to state-of-the-art techniques only a limited number (e.g. up to 100) light sources 102 can be identified in a lighting system 100 based on coded lighting. This problem can be overcome by methods, devices and system concepts as disclosed below which mitigates the dependency of the number of light sources in the lighting system 100 during assignment and detection of identifiers of the light sources 102.

The emitted light comprises a modulated part associated with coded light comprising a light source identifier. A method for assigning identifiers to light sources will be disclosed below. The emitted light may also comprise an unmodulated part associated with an illumination contribution. Each light source 102 may be associated with a number of lighting settings, inter alia pertaining to the illumination contribution of the light source, such as color, color temperature and intensity of the emitted light. In general terms the illumination contribution of the light source may be defined as a time-averaged output of the light emitted by the light source 102.

The lighting system 100 further comprises an apparatus 104, termed a receiver, for detecting and receiving light, such as the coded light comprising the light source identifier emitted by the light source 102 as well as the light emitted by light sources outside the lighting system 100 (not shown).

The lighting system 100 may further comprise an apparatus 110 termed a light driver for assigning an identifier to the light sources 102. In order to achieve such an assignment, as schematically indicated by arrow 112, the light driver 110 may be arranged to perform a number of functionalities. These functionalities will be described below with reference to the flowchart of FIG. 5. The light driver 110 may be part of a central controller. It may comprise or be part of a processing unit. For example, the functionality of the light driver 110 may be performed during manufacturing of the light sources 102.

With reference to FIG. 1, a user may want to select and control a light source 102 in the lighting system 100 by using the receiver 104. To this end, the light sources 102 emit a unique identifier via the visible light 106. The receiver 104 has a (directional optical) light sensor, which while pointing can distinguish the light contributions of the different light sources and select the relevant light source 102. This light source 102 may then be controlled over a communications link, for example a radio frequency link 108, e.g. based on ZigBee.

Alternatively, with reference to FIG. 1, the user may want to control light sources 102 in the lighting system 100 in order to create light in a certain position and/or with a required intensity and/or light color. To this end, the light sources 102 emit a unique identifier via the visible light 106. The receiver 104 has a light receiver, and is able to distinguish and estimate the magnitude of the light contributions of the different light sources 102 in that location. The receiver 104 can then estimate the required contributions of the identified light sources 102 and communicate the new light setting to the light sources 102, as indicated by arrow 108 in FIG. 1.

Figure 2A:
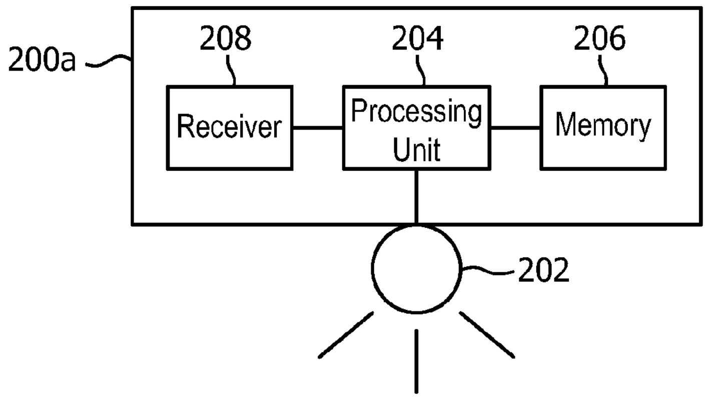
FIG. 2(*a*) is a light source according to an embodiment.
Figure 2B:
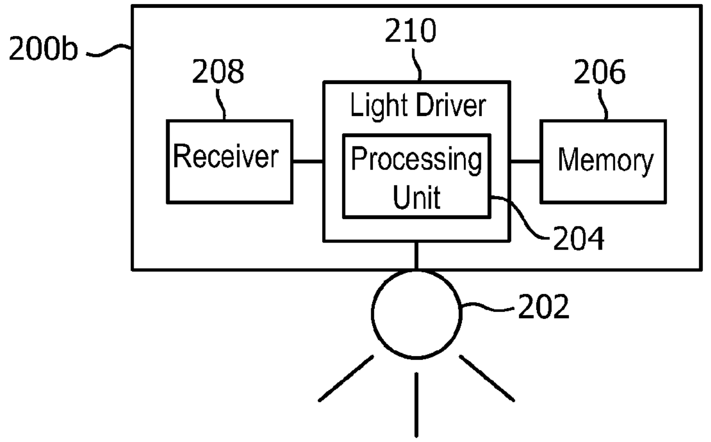

FIG. 2(*a*) and FIG. 2(*b*) schematically illustrate functional block diagrams of a light source 200*a*, 200*b*, such as the light source 102 of FIG. 1 disclosed above. The light source 200*a*, 200*b* may thus be configured to emit illumination light as well as coded light, wherein the coded light comprises a light source identifier of the light source 200*a*, 200*b*. The light source 200*a*, 200*b* comprises an emitter 202 for emitting the coded light. The emitter 202 may comprise one or more LEDs, but it could as very well comprise one or more FL or HID sources, etc. In the IR case, typically an IR LED will be placed in proximity of the primary light source. The primary light source is associated with the illumination function of the light source (i.e. for emitting the illumination light) and can be any light source, and the secondary light source is associated with the light source identifier (i.e. for emitting the coded light). Preferably this secondary light source is a LED. The light source 200*a*, 200*b* further comprises a receiver 208 for receiving information, such as an identifier, to assign a modified light source identifier to the light source 200*a*, 200*b*. The receiver 208 may be a receiver configured to receive coded light. The receiver 208 may comprise an infrared interface for receiving infrared light. Alternatively the receiver 208 may be a radio receiver for receiving wirelessly transmitted information. Yet alternatively the receiver 208 may comprise a connector for receiving information transmitted by wire. The wire may be a powerline cable. The wire may be a computer cable.

The light source 200*a*, 200*b* may further comprise other components such as a processing unit 204 such as a central processing unit (CPU) and a memory 206. As illustrated in FIG. 2(*b*) a light driver 210 may be part of the processing unit 204. Alternatively, as illustrated in FIG. 2(*a*) the light source 200*a* does not comprise a light driver. The light driver may then be part of the lighting system 100, as disclosed above with reference to FIG. 1. Yet alternatively, the light source 200*a*, 200*b* may have been provided with identifiers during manufacturing of the light source 200*a*, 200*b*. As illustrated in FIG. 2(*b*) the light driver 210 may be operatively connected to the receiver 208, the memory 206 and the emitter 202. The light driver 210 may receive information from the receiver 208 pertaining to assigning an identifier to the light source 200. By e.g. utilizing the processing unit 204 the light driver 210 may change the encoding of the coded light such that the coded light emitted by the emitter 202 comprises the identifier. In order to achieve such an assignment the light driver 210 may be arranged to perform a number of functionalities. These functionalities will be described below with reference to the flowchart of FIG. 5. Information pertaining to the identifiers, such as identifiers and code parameters may be stored in the memory 206. Thus, in the example of light source 200*a* of FIG. 2(*a*), which does not comprise a light driver, the light source 200*a* may assign new identifiers to the light source 200*a* based on information received by the receiver 208 pertaining to identifiers and code parameters stored in the memory 206.

A luminaire (not shown) may comprise at least one light source 200*a*, 200*b*, wherein each light source may be assigned individual light source identifiers. Preferably this light source is a LED-based light source.

Figure 6:
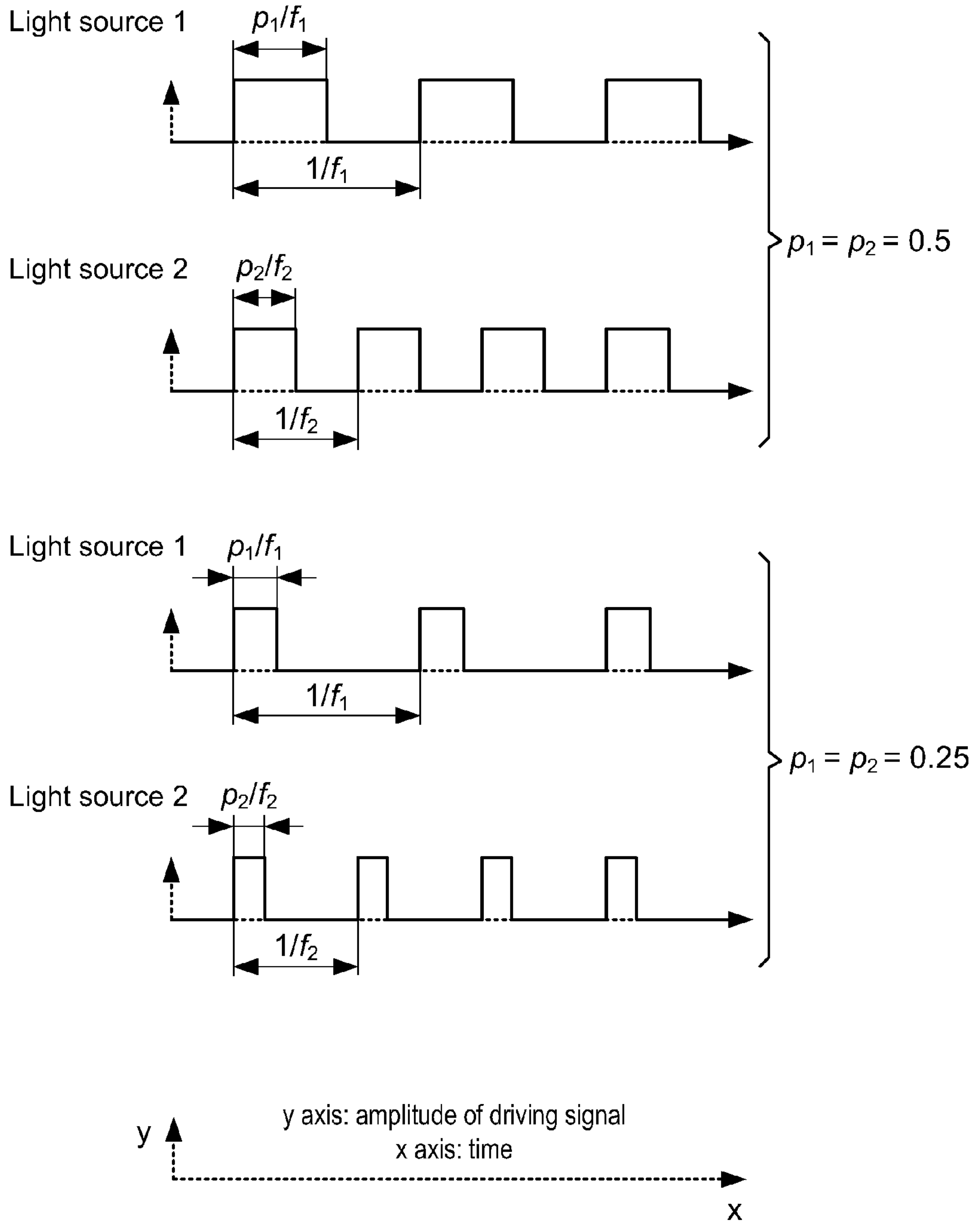
FIG. 6 illustrates examples of pulse width modulation signals.

FIG. 6 shows an example of a pulse width modulation (PWM) driving signal for exemplary light sources 1 and 2. PWM is an efficient way to dim the light output of a light source. In the PWM method the light source is driven (i.e. outputting light) at a nominal current level for a part of the time and not driven (i.e. not outputting light) in the remainder of the time. The PWM signal consequently consists of a repeated pulse train. The on-ratio is often referred to as duty cycle p. In the upper part of FIG. 6 the duty cycle for light source 1 (denoted $p_1$) is identical to the duty cycle of light source 2 (denoted $p_2$). More particularly, $p_1=p_2=0.5$. In the lower part of FIG. 2 the duty cycles are $p_1=p_2=0.25$. With a high duty cycle, more current is on average delivered to the light source and light with a higher intensity is thus outputted from the light source. The light output of the light source closely follows the current signal, and will be similar to the signal depicted in the figure. Typically the frequency of the PWM signal is larger than several hundred Hertz (Hz), such that the on and off switching of the light is invisible to the human visual system. For light source 1 in FIG. 6 the frequency of the PWM signal is denoted $f_1$. Likewise, for light source 2 in FIG. 6 the frequency of the PWM signal is denoted $f_2$. In this illustrative example $f_1<f_2$.

FIG. 6 illustrates that LEDs can be assigned a unique frequency $f_1$, of the PWM signal, which acts as a coded light identifier for the light source. This unique frequency makes the light originating from the light source uniquely identifiable. This method of coded light is referred to as frequency division multiplexing (FDM). Since the light output is only regulated by the duty cycle, i.e. not by the frequency, the light source can be dimmed by varying this duty cycle.

Figure 3:
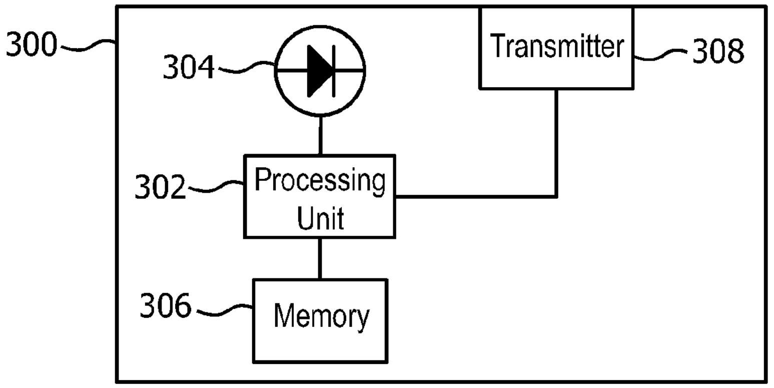
FIG. 3 is a receiver according to an embodiment.

A functional block diagram for a receiver 300 according to an embodiment of the present invention is given in FIG. 3. The receiver 300 comprises a processing unit, schematically illustrated by reference numeral 302, arranged to estimate an assigned identifier to the light source 102 based on light received by a light receiver 304 of the receiver 300. In order to achieve such detection the processing unit 300 is arranged to perform a number of functionalities. These functionalities will be described below with reference to the flowchart of FIG. 7. The receiver 300 further comprises a memory 306 and a transmitter 308. The memory 306 may store instructions pertaining to the functionalities to estimate an assigned identifier. The transmitter 308 may be utilized in order to communicate updated identifiers to light sources 102 in lighting system 100.

Figure 4:
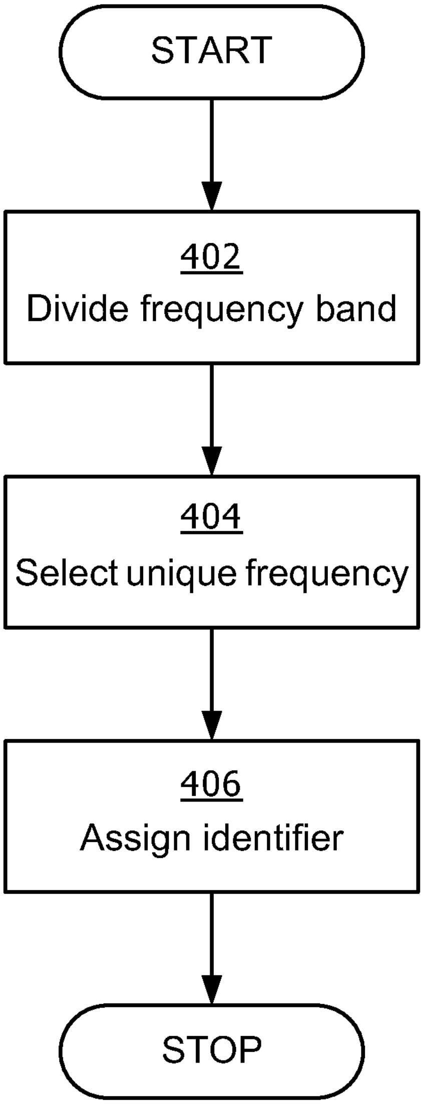
FIG. 4 is a flowchart according to an embodiment.

A method for assigning identifiers to light sources in a coded lighting system will now be described with reference to the flowchart of FIG. 4. The disclosed method is presented in a FDM context.

An available frequency band is divided into N non-uniform (non-overlapping) frequency regions, step 402. The available frequency band may thus be defined by an available bandwidth. The available frequency band is defined between a lower-limit frequency and a upper-limit frequency. By dividing the frequency band in N (non-overlapping) frequency regions the frequency range up to the entire Nth harmonic range can be used in the detection and estimation in the receiver 300. The lower-limit frequency may include frequency value zero. For VL coded light, however, typically the lower frequency will be higher than 100 Hz to avoid visibility. The higher frequency is limited by the bandwidth of the light driver 110, 210 and properties of the light sources, and is typically in the order of 1-10 MHz. Practical values for the lower-limit and upper-limit frequencies of the lower-most frequency region are 2 and 4 kHz, respectively. The light sources may also be divided into N (non-overlapping) groups correspondingly.

In general, the frequency width of each such non-uniform frequency region may differ from frequency region to frequency region. That is, the frequency regions may be associated with a specific width. To simplify the notation and without losing generality, in the following normalized frequency values will be assumed. More particularly the (normalized) lower-limit frequency value will be assumed to take value 0 and the (normalized) upper-limit frequency value will be assumed to take value 1.

Moreover, the width of the non-uniform frequency regions may be higher for a low frequency region than the width of the high frequency region. That is, the frequency regions may be associated with a specific order. Even more so, the width of the non-uniform frequency regions may decrease as the frequency content therein increases. That is, the frequency regions may be associated with a specific width and order. Particularly, a width of frequency region n, where $1 \leq n < N-1$, may be given by normalized frequency value $2/((n+1)(n+2))$. The width of frequency region N is for this case given by $2/(N+1)$. Particularly, the lower limit for frequency region n may for $1 \leq n \leq N-1$ be given by normalized frequency value $(n-1)/(n+1)$. Since the width of frequency region N may be given by $2/(N+1)$ and the width of the (normalized) total available frequency band is 1, the lower limit for frequency region N may be given by 1-21 (N+1).

A unique frequency for each light source is then selected from a set of uniformly spaced frequencies in one of the non-uniform frequency regions, step 404. That is, the frequencies are uniformly spaced within each frequency region. However, the spacing between the uniformly spaced frequencies may differ between different ones of the frequency regions. Particularly, the spacing between the uniformly frequency spacing may be greater for a low frequency region than for a high frequency region.

In general, the number of frequency values in each non-uniform frequency region may differ from frequency region to frequency region. Particularly, denote by $L_n$ the number of uniformly spaced frequencies in region n. A ratio between the $L_n$ and $L_{n+1}$ may be given as $L_n/L_{n+1}=(2+n)/(1+n)$. Thus, given the number of uniformly spaced frequencies in region n the number of uniformly spaced frequencies in region n+1 can be found, or vice versa. Particularly, by defining a value for the number of uniformly spaced frequency values $L_1$ in region 1 the number of uniformly spaced frequency values for the remaining N−1 regions may be found. Typically each region may comprise up to a few hundred uniformly spaced frequency values.

The unique frequency is then used to modulate light to be outputted by each light source. Thereby an identifier is assigned to each light source, step 406. Light to be emitted by the light sources may be modulated according to pulse width modulation. A duty cycle of the pulse width modulation may depend on the unique frequency associated with the identifier assigned to each light source. Denote by $p_i$ the duty cycle of light source i in frequency region n, $1 \leq n \leq N-1$. Then it may be required that $\sin(\pi(n+1)p_i) \neq 0$. For group N it may be required that $\sin(\pi N p_i) \neq 0$. One reason for these conditions may be that it may be desirable to detect the identifiers of the nth group based on the (n+1)th harmonic of the signal. For $\sin(\pi(n+1)p_i)=0$, however, the contribution of source i in the (n+1)th harmonic is zero. Consequently, detection would be impossible. For example, the duty cycle of any light source in group 1 should not be equal to ½, since this would result in a second harmonic for which the amplitude equals zero. This does not allow its estimation.

However, if it is required that the duty cycle of a light source $p_i$ is set to be the value that is not allowed, the duty cycle may be adjusted by a small value $\delta_p$. In this case duty cycle $p_i$ of light source i in frequency region n, $1 \leq n \leq N-1$, may be adjusted to $p_i+\delta_p$, such that $|(\sin(\pi(n+1)p_i))/(\pi(n+1))| > \delta_p$. Similarly, for frequency band N duty cycle $p_i$ of light source i in frequency band N, may be adjusted to $p_i+\delta_p$, such that $|(\sin(\pi N p_i))/(\pi N)| > \delta p$. A typical value of $\delta_p$ is $\delta_p \approx 4.001$.

The light to be emitted by the light sources may also be associated with a dimming level, corresponding to the relative light intensity of the light source. The duty cycle of the pulse width modulation may depend on the dimming level of the light source.

Figure 7:
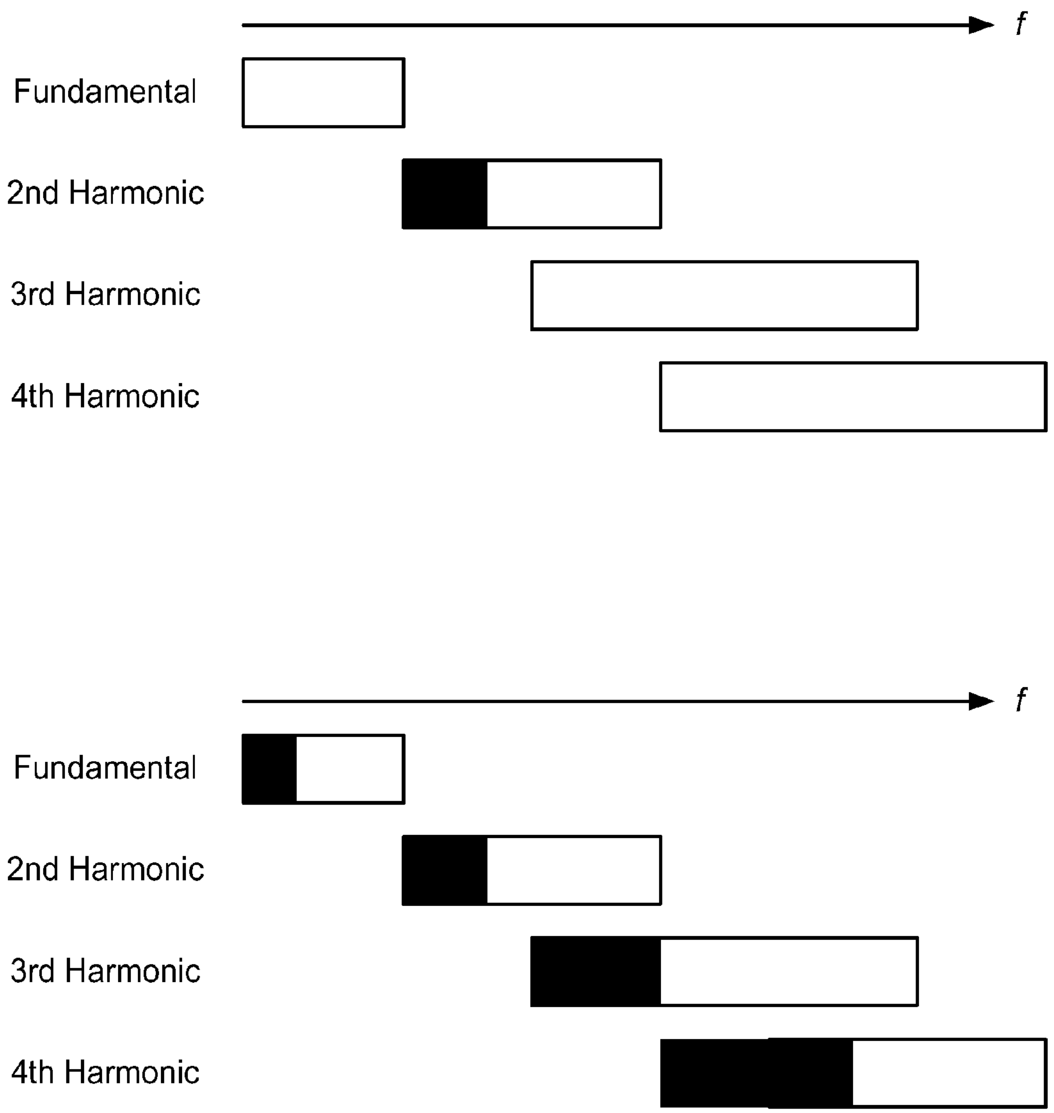
FIG. 7 is an illustration of frequency ranges for different harmonics.

FIG. 7 shows the frequency range of different harmonics of light received by the receiver. It can be seen that the frequency ranges are overlapping. For instance, the third harmonic range is partially overlapping the second harmonic range. This overlapping behavior indicates that the signals from different light source are correlated. Hence, an estimator of identifiers of the light sources exploiting these harmonics could suffer from this correlation and the estimation performance could therefore be limited. Moreover, the correlation between different light sources signals may be dependent on unknown parameters such as phase and frequency.

Hence it is not straightforward to generate a well performing estimator. A further inspection of FIG. 7 indicates that there is no frequency overlapping in the first half (approximately) of the second harmonic range. This means that there is no interference from other harmonics of other light sources in the first half of the second harmonic range. In other words, an estimator may be developed in this frequency range only based on this harmonic, without considering the influence of other identifiers. This we will refer to as an individual estimator. In addition, as long as the frequency separation between the second harmonics from different light sources is set to be 2/T, where T is the response time of the receiver, an individual estimator, e.g. based on a filterbank, using a triangular windowing function may be used. Equivalently, the frequency separation between the fundamental frequencies is 1/T. Hence, through the use of the second harmonic, the light sources are closer packed by a factor of two compared to a system applying the detection based on the fundamental frequency. Further, if the fourth harmonic signal of the light sources in the first half can be estimated from the corresponding second harmonics, these fourth harmonic signals can be subtracted from the total received light signal and some part of the third harmonic frequency range will be released from frequency overlapping.

Multiple harmonics may be considered because the frequencies are spaced further apart in the harmonics in the fundamental frequency, thereby enabling the parameters of the frequency identifiers to be distinguished and accurately estimated. The estimation process is based on the following general principles. The parameters of the light sources in the frequency range 1 may be estimated by use of the second harmonics (as is illustrated in the upper part of FIG. 7). The total received light signal, including all the harmonics, may then be subtracted from the total received signal. After that, the estimation process may continue with estimation of identifiers for light sources in the second group of light sources with the use of the third harmonics. The width of the frequency range for the first group may hence be determined such that overlapping between the third and second harmonic range can be removed, as illustrated by the dark regions in FIG. 7. In the illustrative example of FIG. 7 the first frequency range takes about the first one third of the entire frequency band. Similarly, the frequency range from about the one third to the about one half of the entire frequency band, i.e. about ⅙ of the entire spectrum, is allocated to the second group. The parameters of the light source signals in the second group can be estimated based on the third harmonics (as is illustrated in the lower part of FIG. 7). The signal parameters of the following light sources can then be estimated based on at least the forth harmonics. This procedure can be extended to all N groups systematically.

Figure 5:
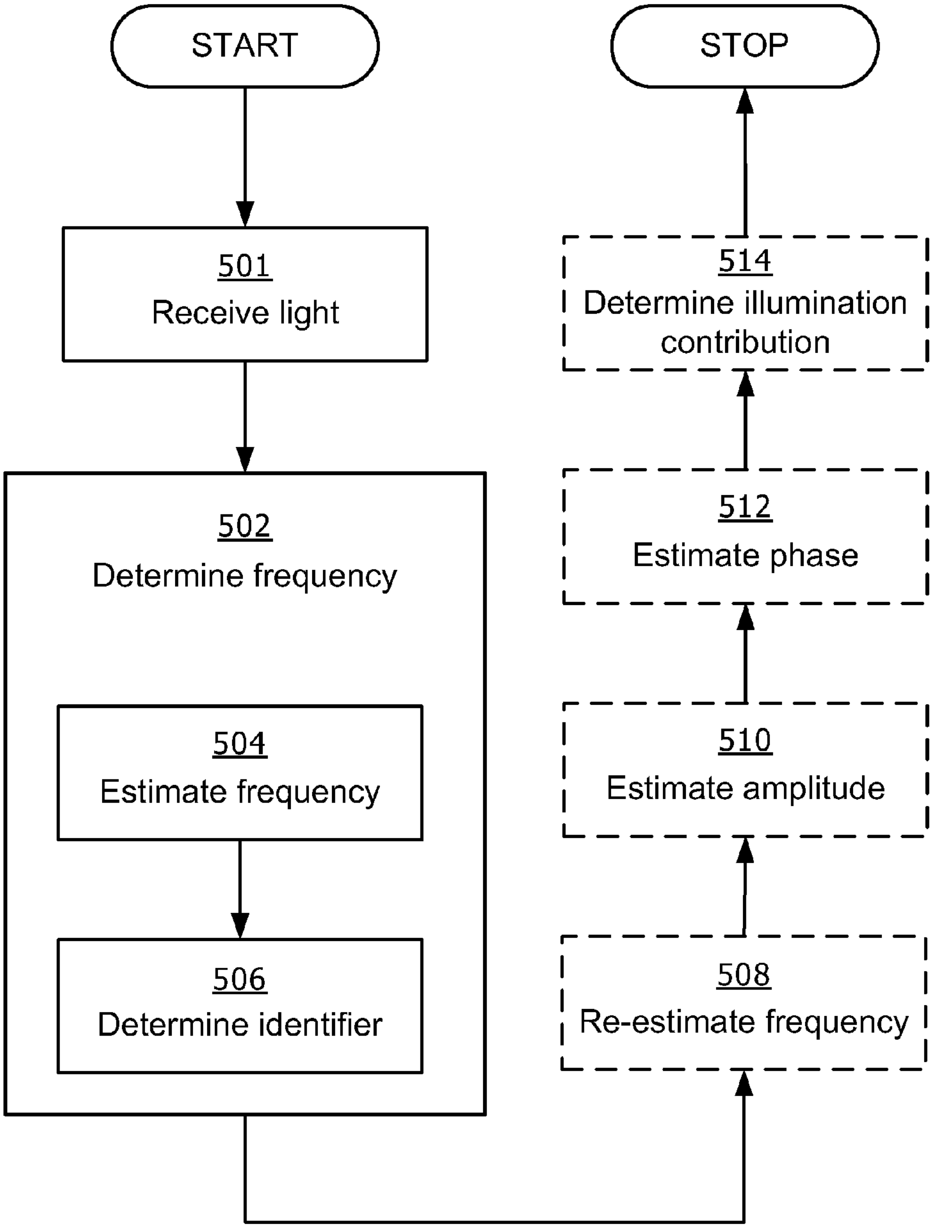
FIG. 5 is a flowchart according to an embodiment.

A method for estimating identifiers assigned to light sources in a coded lighting system will now be described with reference to the flowchart of FIG. 5.

Light is received by the receiver 104, 300, step 501. A unique frequency selected from a set of uniformly spaced frequencies in one of N non-uniform frequency regions of the available frequency band is estimated, step 502. This step has a number of sub-steps. For each frequency region n, 1≤n≤N−1, the unique frequency is estimated based on harmonic (n+1) of received light, step 504. The estimation of the exact frequency may be required due to frequency offsets occurring in the light source driver 204. These may e.g. be caused by non-idealities in the components of the light source driver 204. In general, the estimation of the received light signal, or illumination contribution may be said to be undertaken successively. Starting from n=1 to n=N−1 a number of parameters, such as frequency, amplitude and/or phase of each light source in group n can be estimated based on harmonic (n+1) of the received light signal. For n=N the parameters of each light source in group N may be estimated based on harmonic N. The identifiers are determined from the unique frequencies, step 506.

Figure 8:
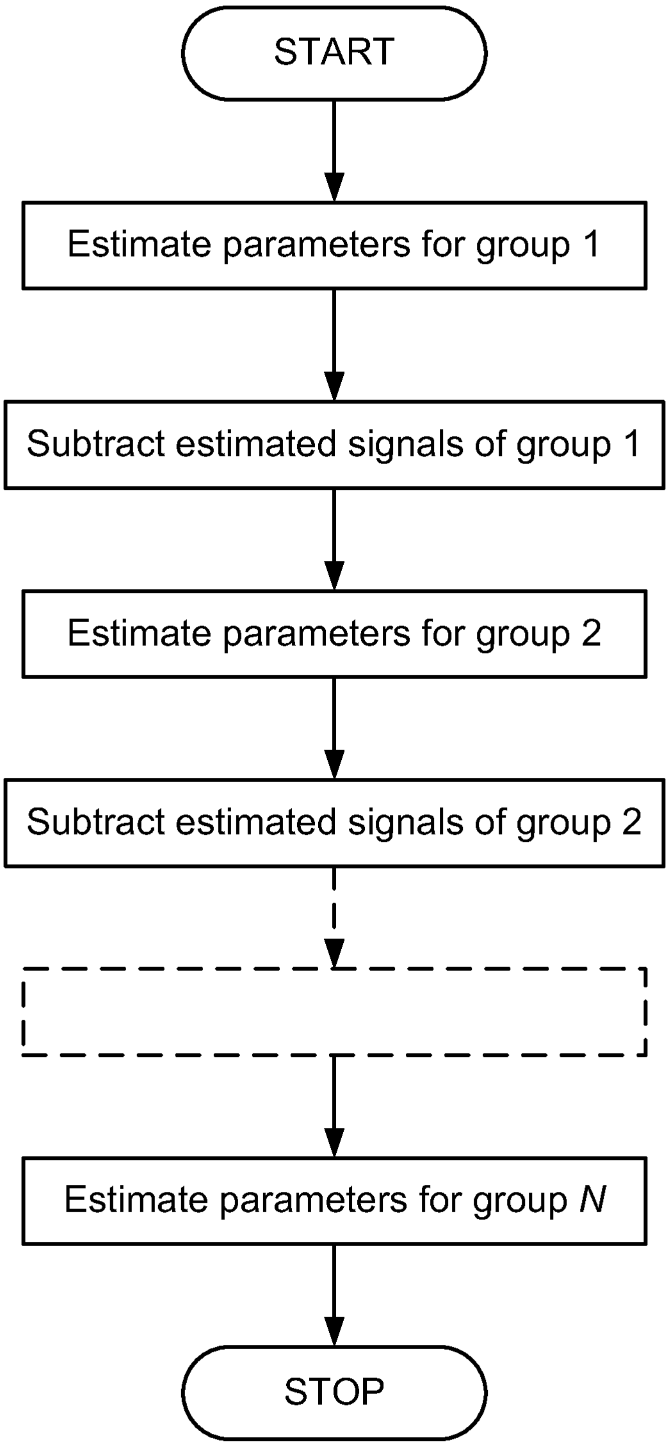
FIG. 8 illustrates a successive iteration process.

A total estimated signal assigned a frequency in frequency region n, may be subtracted before estimating the unique frequency for frequency region n+1. This iterative process is illustrated in FIG. 8. Particularly, each unique frequency in the frequency region n may be estimated, by for each identifier i in frequency region n, subtracting the estimated harmonic (n+1) with neighboring frequencies, The unique frequency may be re-estimated by locating a frequency peak within a predefined distance from (n+1)f, where f is a previous estimate of the unique frequency, step 508.

In the above, a successive estimator may be used. In each step of the estimator, the signal parameters of the light sources in a group n are estimated on one of the harmonics and then all the harmonics of the light source signals are subtracted from the total received signal. In order to make such subtraction, all the signal parameters may have to be estimated with high accuracy. In this section, we explain how each of such component parameter estimator works.

Consider frequency region n, 1≤n≤N−1. The signals from the previous groups from 1 to n−1 have thus been subtracted. Only the frequency spectrum, denoted by $F_n$, within the (n+1)th harmonics of light sources in the nth group needs to be considered. For this a filter can be applied to the resulting signal after the subtraction. In an initial step the estimated frequency, $\hat{f}$, of each light source is assumed to be equal to the ideal frequency $\bar{f}_i$ without frequency offset. The Fourier transform F( ) of the received signal is then determined and $F(\hat{f}_i)$ is considered.

Further, an amplitude of the received light may be estimated, step 510. A phase of the received light may also be estimated, step 512. The estimated value for amplitude is $\hat{\alpha}_i=|F(\hat{f}_i)|/b_{i,n+1}$ where $b_{i,n}$ is the magnitude of the nth harmonic, and the phase of the (n+1)th harmonic is $\hat{\phi}_{i,n+1}$=angle $(F(\hat{f}_i))$. This estimator is basically an individual estimator, which implements the proposed receiver.

To improve the performance of the estimation process proposed, one can extend with the following approach. This approach considers the use of an iterative algorithm, where the following iteration may be run for $N_I$ times:

At each iteration, the following steps may be performed from i=1 to $L_n$. For each ith light source, the estimated (n+1)th harmonic signals of the light sources is subtracted with neighboring light sources. Specifically, for j with $|j-i|<L_{neighbor}$, the (n+1)th harmonic spectrum, $\tilde{F}_j(f)$, of the jth light sources can be reconstructed based on $\hat{\alpha}_i$, $\hat{f}$_i and $\hat{\phi}_{i,n+1}$. $\tilde{F}_i(f)=F_n(f)-\Sigma_j\tilde{F}_j(f)$ may then be obtained.

The peak of $|\tilde{F}_i(f)|$ is located and the corresponding frequency is the updated $\hat{f}_i$. Then $\hat{\alpha}_i=|\tilde{F}_i(\hat{f}_i)|/b_{i,n+1}$ can be updated and $\hat{\phi}_{i,n+1}=\text{angle}(\tilde{F}_i(\hat{f}_i))$. If a fast Fourier transform (FFT) is used, $|\tilde{F}_i(f)|$only takes values at discrete frequency bins. In this case, the peak of the frequency may be located through the following interpolation procedure.

The two frequency bins $f_1$ and $f_2$ may be located such that $|\tilde{F}_i(f_1)|$ and $|\tilde{F}_i(f_2)|$ are of the value that is closest to the value, say, $\epsilon\max|\tilde{F}_i(f)|$, where $\max|\tilde{F}_i(f)|$ is estimated from all frequency bins and where $0<\epsilon<0$ is a constant. This could be used to detect edges. A typical value of $\epsilon$ is $\epsilon=0.8$. Then $\hat{f}_i=(f_1+f_2)/2$.

Since the phase is estimated at a higher harmonics, phase ambiguity may occur for the corresponding lower harmonics and fundamental frequency. The phase ambiguity may be resolved as follows. With access to $\hat{\phi}_{i,n+1}$ for each i in the nth group, $\hat{\phi}_i$ may still not be determined since there are n+1 possible candidate phases due to the phase ambiguity. The estimation $\hat{\phi}_i$ can be used to reconstruct other harmonic signals so that the signal parameter of the successive frequency regions can be estimated. The phase ambiguity can be resolved by using the nth harmonic range of the nth group. Based on $\hat{\phi}_{i,n+1}$, $\hat{\phi}_{i-1,n+1}$ and $\hat{\phi}_{i+1,n+1}$, all the possible combination of candidate phases for on $\hat{\phi}_{i,n}$, $\hat{\phi}_{i-1,n}$, and $\hat{\phi}_{i+1,n}$ can be listed. Then, for each of the combination, with access to $\hat{\alpha}_i$, $\hat{\alpha}_{i-1}$, $\hat{\alpha}_{i+1}$, $\hat{f}_i$, $\hat{f}_{i-1}$, and $\hat{f}_{i+1}$, the spectrum around $n\hat{f}_i$ can be reconstructed. The spectrum around $n\hat{f}_i$ can also be obtained by subtracting the spectrum due to previous groups in this frequency range. These two estimated spectrum may be compared. From the combination which gives the best match of two spectra, the candidate phase with respect to the ith light source may be determined as the updated $\hat{\phi}_i$.

The (estimate of the) amplitude $\hat{\alpha}_i$, may be used to determine individual illumination contributions of the light sources, step 514. From the phase of harmonic (n+1) of each light source, (n+1) candidate phases for the fundamental frequency component can be obtained, and thus (n+1) candidate phases for harmonic n. The candidate phase for each light source may be selected according to a criterion. The criterion may specify that the reconstructed signal of harmonic n should best match the received signal. The best match may be defined by a distance criterion.

Further, the above steps may be repeated iteratively from the first till the last light sources in each frequency region n (i.e. from the light source associated with the lowest frequency in frequency region n to the light source associated with the highest frequency in frequency region n). Moreover, the iteration steps may be repeated a number of times in order to improve the estimation result. The number of estimations may be given by a pre-defined number or the estimation may continue until the results from two successive iterations differ less than a predefined threshold.

The person skilled in the art realizes that the present invention by no means is limited to the preferred embodiments described above. On the contrary, many modifications and variations are possible within the scope of the appended claims.

The invention claimed is:

1. A method for assigning identifiers to light sources in a coded lighting system, said method comprising the steps of:

dividing an available frequency band into N non-uniform frequency regions, and selecting, for each light source of a set of light sources, a unique frequency from a set of uniformly spaced frequencies, respectively, in one of said non-uniform frequency regions, using said unique frequency to modulate light to be outputted by said each light source, thereby assigning an identifier to said each light source, wherein at least one unique frequency is chosen in each of said non-uniform frequency regions.

2. The method according to claim 1, wherein a spacing between uniformly spaced frequencies differs between different ones of said frequency regions.

3. The method according to claim 1, wherein a spacing between uniformly spaced frequencies is greater for a low frequency region than for a high frequency region.

4. The method according to claim 1, wherein a width of said a non-uniform frequency region is greater for a low frequency region than for a high frequency region.

5. The method according to claim 1, wherein said frequency band is, between normalized frequency values 0 and 1, divided into said N frequency regions and wherein for $1 \le n \le N-1$ a width of frequency region n is given by normalized frequency value $2/((n+1)(n+2))$.

6. The method according to claim 1, wherein said frequency band is, between normalized frequency values 0 and 1, divided into said N frequency regions and wherein for $1 \le n \le N-1$ a lower limit for frequency region n is given by normalized frequency value $(n-1)/(n+1)$.

7. The method according to claim 1, wherein a ratio between the $L_1$ uniformly spaced frequencies in region n and $L_2$ uniformly spaced frequencies in region n+1 is $L_1/L_2=(2+n)/(1+n)$.

8. The method according to claim 1, wherein light to be outputted is modulated according to pulse width modulation, and wherein a duty cycle of said pulse width modulation depends on at least one of said unique frequency and a dimming level of said light source.

9. The method according to claim 8, wherein duty cycle $p_i$ of light source i in frequency band n, $1 \le n \le N-1$, is set such that $\sin(\pi(n+1)p_i) \ne 0$.

10. A method for estimating identifiers assigned to light sources in a coded lighting system, wherein said identifiers have been assigned according to the method of claim 1, comprising the steps of:

receiving light;

determining a unique frequency selected from a set of uniformly spaced frequencies in one of N non-uniform frequency regions of an available frequency band by, for frequency region n, $1 \le n \le N-1$:

estimating said unique frequency based on harmonic (n+1) of said received light, and determining said identifiers from said unique frequencies.

11. The method according to claim 10, further comprising, from said received light, estimating at least one of an amplitude and a phase of said received light.

12. The method according to claim 11, further comprising, based on said amplitude, determining individual illumination contributions of said light sources.

13. The method according to claim 10, further comprising subtracting a total estimated signal assigned a frequency in frequency region n before estimating said unique frequency for frequency region n+1.

14. A light driver for assigning identifiers to light sources in a coded lighting system, comprising:

a processing unit arranged to assign an identifier to said light sources whereby, for each light source, said identifier determines a unique frequency to be used to modulate light to be outputted by said each light source, by performing the steps of:

dividing an available frequency band into N non-uniform frequency regions, and selecting said unique frequency from a set of uniformly spaced frequencies in one of said non-uniform frequency regions, wherein at least one unique frequency is chosen in each of said non-uniform frequency regions.

15. A receiver for estimating identifiers assigned to light sources in a coded lighting system, comprising:

a light receiver;

a processing unit arranged to perform the steps of:

determining a unique frequency selected from a set of uniformly spaced frequencies in one of N non-uniform frequency regions of an available frequency band by, for frequency region n, $1 \le n \le N-1$, estimating said unique frequency based on harmonic (n+1) of light received by said light receiver, and determining said identifiers from said unique frequencies.

* * * * *